United States Patent Office 3,265,665
Patented August 9, 1966

3,265,665
NOVEL COPOLYMERS OF ORGANIC ISO-
CYANATES AND ALDEHYDES
Gerald J. Mantell, Kansas City, Mo., and David Rankin,
Kansas City, Kans., assignors, by mesne assignments, to
Gulf Oil Corporation, Pittsburgh, Pa., a corporation of
Pennsylvania
No Drawing. Filed Sept. 1, 1961, Ser. No. 135,440
13 Claims. (Cl. 260—67)

This invention relates to copolymers of organic isocyanates and formaldehyde.

The polymers provided by this invention are normally solid copolymers of an organic isocyanate having from two to about twenty-four carbon atoms and formaldehyde. On a molar basis, the quantity of the copolymer corresponding to the organic isocyanate, or isocyanates, is the minor component. The organic isocyanate is present in a concentration up to about twenty-five percent on a molar basis with the lower level being an average of three units per copolymer chain. Ordinarily, the preferred copolymers of this invention have from about 0.75 to about ten percent on a molar basis of the organic isocyanate component. As to copolymers of certain presently preferred organic isocyanates such as phenyl isocyanate copolymers, a concentration of groups corresponding to about one percent on a molar basis results in highly desirable copolymers.

The organic isocyanate employed in the formation can be any suitable isocyanate which has two to about twenty-four carbon atoms and which is capable of forming with formaldehyde the copolymers of this invention. The organic isocyanates should be free of substituents which significantly interfere with the required reaction with formaldehyde to provide the copolymers. The organic groups of the isocyanates can be aliphatic, cycloaliphatic, aryl, heterocyclic, or the like. The isocyanate monomers can also be either monoisocyanates or polyisocyanates, presently the monoisocyanates being under most conditions preferred. Illustratively, organic isocyanates suitable for the formation of the copolymers of this invention include the monoisocyanates phenyl, methyl, ethyl, propyl, isopropyl, butyl, hexyl, decyl, n-octadecyl, 1-naphthalyl, cyclohexyl, allyl, decenyl, benzyl, phenylethyl, p-chlorophenyl, p-cyanophenyl, trifluoromethyl, ethane sulfonyl isocyanates, or the like isocyanates, and polyisocyanates such as 1,4-phenylene diisocyanate, ethylene diisocyanate, propylidene diisocyanate, cyclohexylene-1,4-diisocyanate, xylylene-1,4-diisocyanate, diphenyl sulfone diisocyanate, hexamethylene diisocyanate, 2,4-tolylene diisocyanate, 4,4'-diphenylmethane diisocyanate, phenylphosphonic diisocyanate, and 1,5-naphthalene diisocyanate. The organic group of the organic isocyanates can include metallic atoms, e.g., phosphorous, sulfur, and silicon atoms. The presently preferred isocyanate is phenyl isocyanate.

In the preparation of the copolymers it has been found highly advisable to use formaldehyde having a high purity and a low moisture content. Suitable formaldehyde for the preparation of the copolymers can be provided as by thermo-decomposition of a polymeric formaldehyde such as commercial paraformaldehyde products or by the decomposition of polyoxymethylene prepared by following procedures described in the art. It is customarily desired to upgrade the purity of the generated formaldehyde, especially as by lowering moisture content. This removal of moisture can be accomplished in the customary manners, as by condensation, distillation, and the like.

The copolymers of this invention in general can be produced by adding a highly pure formaldehyde having a low moisture content continuously by way of a stream of inert gas, such as argon or nitrogen, to a reaction vessel maintained at appropriate temperature. Simultaneously an organic isocyanate, or a combination of organic isocyanates if desired, is added to the reaction vessel. The organic isocyanate comonomer (especially if the selected organic isocyanate is normally solid) can be conveniently transferred to the reaction vessel as a solution employing an inert solvent which can also serve completely or partially as the reaction solvent.

The reaction vessel contains an inert reaction medium such as suitable aliphatic solvents, e.g., hexane, heptane, octane, or the like; aromatic solvents such as benzene, toluene, and the like; and combinations thereof. Ethers represent another illustrative class of solvents usable as the reaction medium. Solvents which interfere with the co-reaction of the monomers to form the copolymers of this invention of course should be avoided. In the selection of the solvent, it is preferred to select a solvent that exhibits adequate solubility of the monomers but a low solubility of the high molecular weight copolymers produced. This enables a ready separation of the produced polymer, which can be accomplished by filtration, decantation, or the like, in conventional manner. It has been found that hexane and toluene perform adequately as the reaction solvents.

Temperatures in the range of about $-100°$ C. to about $50°$ C. can be suitably employed in the formation of the polymers. Preferable temperatures have been found to be about $-70°$ C. to about $40°$ C., depending upon the particular organic isocyanate employed and other considerations. During the reaction, the inert gas employed to carry the formaldehyde into the reaction vessel also serves to maintain oxygen and moisture at low levels in the atmosphere in contact with the reaction mixture.

The removed polymer can be washed as with the dry inert solvent employed as the reaction medium, or any other suitable solvent. It has been found suitable to, for example, employ hexane, xylene, or methanol as the wash solvents, or combinations thereof. Especially have combinations of washes been found successful in which one of the dry inert solvents is followed by washing with methanol. The removed white granular product is then dried as desired as in a vacuum oven at ambient room temperatures.

It is believed the organic isocyanate of the produced copolymers is incorporated in the copolymeric chain as illustrated by the following structural segment when phenyl isocyanate is the organic isocyanate utilized:

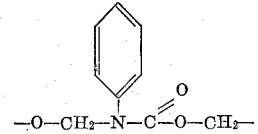

$$-O-CH_2-N-C\overset{O}{\underset{}{-}}O-CH_2-$$

To illustrate, infrared spectra of the copolymers do not show the presence in the copolymers of significant quantities of hydroxyl, —NH—, isocyanate, or other groups inconsistent with the above proposed structure. The results of solvent fractionations of the copolymers coupled with infrared analysis also indicate the polymer products to be copolymers in accord with the above proposed structure. Although the above is believed to depict the correct structure, it is to be understood that the invention is not limited thereto.

The polymers of this invention have a high heat stability, are flexible, and are characterized by having excellent tensile strength or toughness. Polymers produced hereby are characterized by having an intermediate melting point which affords ready molding and yet resistance to degradation at higher temperatures to which the molded articles are exposed. The polymers provided hereby, especially the presently more preferred polymers, exhibit a high hardness as measured by the conventional Barcol hardness test and also show a high degree of crystallinity as shown by X-ray analysis. As the isocyanate portion of the copolymer increases, the percentage of crystallinity and the Barcol hardness customarily diminish. Depending upon the nature of the end polymer desired, either the more hard and stiff copolymers with the lesser concentrations of the organic isocyanate component or the more flexible materials with ordinarily the high concentrations, will be provided.

The melting point of the copolymers, or more accurately termed the softening point, can be conveniently determined employing conventional techniques as by use of the Fisher-Johns block apparatus.

The organic isocyanate copolymers exhibit good thermal stability at high temperatures, for example, at temperatures in excess of 200° C. The preferred copolymers also ordinarily demonstrate desired retention of flexibility even after exposure to about 100° C. temperatures for several days, e.g., a one week period.

At times it will be desired to increase the stiffness or decrease solvent solubility or both, of the copolymers of an organic monoisocyanate and formaldehyde. This can be induced by the incorporation of a small amount of an organic polyisocyanate such as a diisocyanate such as tolylene diisocyanate, or the like, into the reaction mixture. An amount of the polyisocyanate of one to about twenty mole percent on the basis of the total isocyanate employed will be generally sufficient for this purpose. However, in employment of large quantities of polyisocyanate there is believed to be a considerable degree of cross-linking which results in a diminishment in the desired flow properties ordinarily demanded in molding. Thus, if a molding resin is desired, caution should be used in adding the polyfunctional organic isocyanate.

In order to increase the stability of the polymeric chain, the recovered copolymers having terminating hydroxyl groups can be altered by utilizing one of the several known reactions of the hydroxyl group. For example, the hydroxyl groups can be acylated as with an acetylating agent, for example, acetyl chloride or acetic anhydride. The hydroxyl groups can also be reacted to effect a stabilization such as by etherification, by a post reaction with an organic isocyanate, and the like.

Catalysts can ordinarily be incorporated into the reaction mixture to advantage. Suitable catalysts include the metal organic catalysts, e.g., n-butyllithium; amine catalysts, e.g., tri-substituted amines such as triethylamine, and tributylamine, or other amine catalysts which provide the catalysis but do not interfere with production of the polymer; and certain arsine, stibine, and phosphine catalysts such as triphenylphosphine, tributyl phosphine, triethylphosphine, methyldioctylarsine, triethylarsine, triethylstibine, and the like. As to amounts of catalyst used, this can vary greatly depending upon the particular catalyst used, the reaction temperature and other reaction conditions employed, the specific organic isocyanate comonomer employed and its concentration, reaction solvent used in the preparation, and the like. However, generally speaking when a preferred catalyst such as n-butyllithium is employed, it has been found that about 50–220 p.p.m. of catalyst in the medium is adequate.

Although this invention is described particularly with respect to the employment of formaldehyde, it will be suggested to those having skill in the art to which this invention is directed, from the teachings of this invention, to attempt copolymerizations of other aldehydes such as acetaldehyde with organic isocyanates. As such copolymers are within the scope and spirit of this invention, they are meant to be a part thereof.

The polymers of this invention can be employed in the fabrication as by molding of a great number of useful articles, especially in which a rigidity of shape is desired. Such products which can be fabricated from the copolymers of this invention include films, molded articles such as combs, decorative strips, panels, gears, bristles, and the like. Those polymers having the higher concentration of the organic isocyanates will be more amenable to the formation of film and other articles in which a higher degree of flexibility is sought.

The following examples are presented in illustration of the invention but not in limitation thereof.

*Example 1*

To a 500-ml., round bottom flask of a five-neck type are added 350 ml. of dry hexane. The reaction flask is equipped with a stirrer, a gas outlet, a combined inert gas inlet-catalyst entry port, a monomer entry port, and a temperature well. The dry hexane reaction solvent is cooled to —40° C. A catalyst composition of n-butyllithium in dry hexane (0.3 ml. of a 24.9 percent by weight of n-butyllithium) is added to the reaction solvent through the catalyst entry port. During these operations as well as during the entire reaction procedure, the reaction system is purged of oxygen and moisture by conducting the reaction in an atmosphere of argon.

The temperature of the reaction mixture is lowered to —65° C., whereupon a stream of purified formaldehyde (the generation thereof being described below) employing an argon carrier stream and a dry hexane solution of phenyl isocyanate (0.5 ml. of freshly distilled phenyl isocyanate in 15 ml. of dry hexane) are added to the reaction mixture over a period of one hour with stirring. The reaction temperature of about —65° C. is maintained throughout.

Formaldehyde for the copolymer formation is generated by the pyrolysis of paraformaldehyde using a temperature of 150–160° C. The paraformaldehyde employed is a commercial product containing at least about ninety-one percent formaldehyde. The formaldehyde monomer generated is purified by passage through a train of three U-tube traps maintained at —20° C. The traps remove moisture and other impurities. The formaldehyde monomer after passing through the formaldehyde train contains less than 0.01 percent water.

Upon completion of the reaction, the reaction mixture, which consists of a slurry of the produced copolymer of phenyl isocyanate and formaldehyde, is permitted to warm to room temperature while maintaining the stirring. The reaction slurry mixture is removed from the reaction chamber and is quickly filtered. The filtered product consisting of the phenyl isocyanate-formaldehyde copolymer is immediately suspended in about 100 ml. of dry hexane and refiltered. The copolymer product is successively washed one time with xylene and three times with methanol using about 100 ml. quantities of solvent. The product of the copolymer is dried overnight in a vacuum oven maintained at about 50° C.

The yield of the phenyl isocyanate-formaldehyde copolymer is 6.8 g. The product has a softening point of 165–175° C. Analysis: 0.52 percent nitrogen (equivalent to 1.1 mole percent of phenyl isocyanate). The product of the copolymer on molding at 185° C. provided a tough molded specimen exhibiting a Barcol hardness of 66–68. The product is insoluble in most common solvents such as acetone, ethyl alcohol, benzene, and tetrahydrofuran at room temperatures, but exhibits a solubility in some strongly polar solvents at 100° C., such as dimethyl formamide, and p-chlorophenol.

*Examples 2–5*

By following the procedure of Example 1 with the required adjustments in rate of monomer introduction, phenyl isocyanate-formaldehyde copolymers as follows are prepared:

(A) 0.5 mole percent phenyl isocyanate having a Barcol hardness value of 70;

(B) 2.3 mole percent phenyl isocyanate having a Barcol hardness value of 51;

(C) 3.3 mole percent phenyl isocyanate having a Barcol hardness value of 59; and (D) 8.3 mole percent phenyl isocyanate having a crystallinity of seven percent by X-ray analysis.

*Example 6*

A 2 g. quantity of the phenyl isocyanate-formaldehyde copolymer provided by Example 1 is added to a three-neck, round bottom flask having a 200-ml. volume and containing 100 ml. of dry heptane. The reaction flask is equipped with a stirrer, a gas inlet, and a gas outlet to provide means for carrying on the reaction in an argon atmosphere. To the reaction mixture is added 10 ml. of acetic anhydride and 8 ml. of pyridine. The temperature of the mixture is then raised to reflux temperature (85° C.). The temperature of the mixture is maintained at reflux for about four hours, with slow stirring. The cooled reaction mixture is filtered using a glass vacuum filter. The removed polymer precipitate is washed once with 50 ml. of dry hexane so as to remove any unreacted acetic anhydride and pyridine, followed by washing four times with 50 ml. quantities of methanol. The acetylated copolymer is dried in a vacuum oven at 50° C. for eighteen hours. The recovery of the acetylated product is about ninety-eight percent.

The acetylated phenyl isocyanate-formaldehyde copolymer provided is molded in a plub mold at a temperature of 185° C. and at a pressure of 5000 p.s.i. The molded specimen shows a decomposition rate of 0.39 percent per minute at 222° C.

A five-mil film of the acetylated copolymer containing dispersed therein five percent by weight of diphenylamine is exposed to the atmosphere in an oven at 105° C. for seven days. The film specimen after this temperature exposure remains tough and flexible.

*Example 7*

A solution of 0.5 ml. of propyl isocyanate (99.5 percent purity) in 15 ml. of dry hexane is added over a period of eighty-five minutes to a solution of 350 ml. of dry hexane at room temperature to which has been added 0.3 ml. of a hexane solution containing 24.9 percent of n-butyllithium on a weight basis. Dry formaldehyde gas generated from paraformaldehyde is simultaneously added continuously in a stream of argon to the dry hexane reaction. Agitation is maintained during the entire run. An increase in reaction temperature from 27 to 42° C. occurred. The formaldehyde stream is stopped when the isocyanate addition is completed and agitation is continued for a period of 45 minutes.

The white solid product consisting of the propyl isocyanate-formaldehyde weighed 11 g. after washing twice with about 100 ml. quantities of dry hexane, about four times with about 100 ml. quantities of methanol, and after drying the washed product overnight in a vacuum oven at 50° C. The product containing 0.68 percent nitrogen (equivalent to about 1.49 mole percent) softens at 160–165° C. A molded disc of the polymer shows a Barcol hardness of 69–71. A medium intensity carbonyl band appeared at 5.8 microns in the infrared spectrum, indicating the structure to be of the general structure hereinabove suggested.

*Example 8*

Following the procedure of Example 1, one ml. of tolylene dissocyanate in 14 ml. of dry hexane is added over a period of one hour simultaneously with a separate stream of purified formaldehyde to 350 ml. of dry, stirred dry hexane maintained at −65° C. in an argon atmosphere. At the end of the reaction period, the reaction mixture slurry is warmed to room temperature with stirring. The solid copolymer of tolylene diisocyanate and formaldehyde is filtered off and immediately washed with dry hexane to remove any residual diisocyanate monomer. The washing is continued by reslurrying successively one time in toluene and three times in methanol. The washed copolymer consisting of a white solid is dried in vacuo at 50° C. for 18 hours. The yield of the copolymer is 8.7 g. analyzing 1.22 percent nitrogen, equivalent to about 1.3 mole percent of groups corresponding to tolylene diisocyanate. The product sinters before exhibiting a softening point but can be molded at 185° C. and 5000 p.s.i. to give a molded disc showing a Barcol hardness value of 62–63.

What is claimed is:

1. A normally solid, tough, flexible copolymer produced by simultaneously adding as the sole reaction components to an inert liquid reaction medium maintained at a temperature between about minus 100° C. and 50° C. gaseous, substantially pure formaldehyde and at least one organic isocyanate having from two to about twenty-four carbon atoms and reacting said formaldehyde with said isocyanate under substantially moisture-free and oxygen-free conditions in the presence of a polymerization catalyst, said organic isocyanate being employed in an amount such that it is incorporated into the copolymer in the amount of 0.75 to 25 mole percent based on total moles of both formaldehyde and isocyanate, said copolymer being further characterized by insolubility in acetone, ethanol, benzene and tetrahydrofuran at room temperature, a Barcol hardness within the range of about 50 to 70 and a capability of being molded under pressure at 185° C.

2. A copolymer of claim 1 wherein the organic isocyanate employed to provide the copolymer has from two to about twelve carbon atoms.

3. A copolymer of claim 1 wherein the organic isocyanate employed to provide the copolymer is an organic monoisocyanate.

4. A copolymer of claim 1 wherein the organic isocyanate employed to provide the copolymer is phenyl isocyanate, from about 1 to about 8 percent of the polymer units corresponding to phenyl isocyanate, said copolymer having a crystallinity of not less than about seven percent as indicated by X-ray analysis.

5. A copolymer of claim 1 in which the terminating hydroxyl groups of the copolymer have been reacted with a chemical agent capable of forming a stable reaction product with said hydroxyl groups, thereby enhancing the stability of said copolymer.

6. A copolymer of claim 1 wherein the copolymer is of phenyl isocyanate and formaldehyde.

7. A copolymer of claim 1 wherein the terminating hydroxyl groups have been acetylated.

8. A normally solid copolymer of phenyl isocyanate and formaldehyde according to claim 1, said copolymer having about 1.1 percent of polymer units corresponding to phenyl isocyanate, a softening point of 165–175° C. and a Barcol hardness value of 66–68 said copolymer being insoluble at room temperature in acetone, ethanol, benzene and tetrahydrofuran.

9. A copolymer of claim 8 wherein the terminating hydroxyl groups have been acetylated.

10. A normally solid copolymer of propyl isocyanate and formaldehyde according to claim 1, said copolymer having about 1.49 percent of polymer units corresponding to propyl isocyanate, a softening point of 160–165° C. and a Barcol hardness value of 69–71.

11. A normally solid copolymer of phenyl isocyanate and formaldehyde according to claim 1, said copolymer having about 8.3 percent of polymer units corresponding to phenyl isocyanate and a crystallinity of about 7 percent by X-ray analysis.

12. A normally solid copolymer of phenyl isocyanate and formaldehyde according to claim 1, said copolymer having about 23 percent of polymer units corresponding to phenyl isocyanate and a Barcol hardness value of about 51.

13. A normally solid copolymer of tolylene diisocyanate and formaldehyde according to claim 1, said copolymer having about 1.3 mole percent of polymer units corresponding to tolylene diisocyanate and possessing the capability of being sintered and molded under pressure of 5000 p.s.i. at 185° C. to yield solid article having a Barcol hardness value of about 62 to 63.

References Cited by the Examiner

UNITED STATES PATENTS

| | | | |
|---|---|---|---|
| 2,296,249 | 9/1942 | Austin et al. | 260—67 |
| 3,043,803 | 7/1962 | Lewis et al. | 260—67 |
| 3,046,251 | 7/1962 | Wagner | 260—67 |

FOREIGN PATENTS

| | | |
|---|---|---|
| 1,221,148 | 5/1960 | France. |
| 1,353,446 | 1/1964 | France. |
| 770,717 | 3/1957 | Great Britain. |

OTHER REFERENCES

English Translation from Kunststoffe, vol. 53, (1963), pp. 426–436 (pp. 11–21 relied on).

WILLIAM H. SHORT, *Primary Examiner.*

HAROLD N. BURSTEIN, *Examiner.*

A. L. LIBERMAN, L. M. MILLER, *Assistant Examiners.*